United States Patent
Yamagishi et al.

(10) Patent No.: US 8,417,251 B2
(45) Date of Patent: Apr. 9, 2013

(54) MOBILE STATION, MOBILE COMMUNICATION METHOD AND NETWORK DEVICE

(75) Inventors: Hiroaki Yamagishi, Yokohama (JP); Takuya Takimoto, Yokohama (JP); Masashi Kanauchi, Yokosuka (JP); Hideyuki Sakuramoto, Yokosuka (JP); Takehiro Ida, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/126,423

(22) PCT Filed: Oct. 29, 2009

(86) PCT No.: PCT/JP2009/068598
§ 371 (c)(1),
(2), (4) Date: Jul. 8, 2011

(87) PCT Pub. No.: WO2010/050557
PCT Pub. Date: May 6, 2010

(65) Prior Publication Data
US 2011/0263239 A1  Oct. 27, 2011

(30) Foreign Application Priority Data
Oct. 31, 2008  (JP) ................. 2008-282569

(51) Int. Cl.
*H04W 36/00* (2009.01)
*H04W 4/00* (2009.01)
(52) U.S. Cl.
USPC ............. 455/444; 455/432.1; 455/432.2; 455/435.1; 455/435.2; 455/436; 455/437; 455/439; 455/443

(58) Field of Classification Search ........... 455/444
See application file for complete search history.

(56) References Cited

U.S. PATENT DOCUMENTS
2009/0325583 A1 * 12/2009 Burgess et al. ............... 455/444

FOREIGN PATENT DOCUMENTS
JP 2007-088605 A 4/2007

OTHER PUBLICATIONS

3GPP TS 36.304 V8.3.0, Sep. 2008, "3rd Generation Partnership Project; Technical Specification Group Radio Access Network; Evolved Universal Terrestrial Radio Access (E-UTRA); User Equipment (UE) procedures in idle mode (Release 8)," 28 pages.
3GPP TS 36.331 V8.3.0, Sep. 2008, "3rd Generation Partnership Project; Technical Specification Group Radio Access Network; Evolved Universal Terrestrial Radio Access (E-UTRA) Radio Resource Control (RRC); Protocol specification (Release 8)," 3 pages.
3GPP TS 36.331 V8.3.0, Sep. 2008, "3rd Generation Partnership Project; Technical Specification Group Radio Access Network; Evolved Universal Terrestrial Radio Access (E-UTRA) Radio Resource Control (RRC); Protocol specification (Release 8)," 178 pages.

(Continued)

*Primary Examiner* — Huy C Ho
(74) *Attorney, Agent, or Firm* — Osha • Liang LLP

(57) ABSTRACT

A mobile station (UE) according to the present invention includes a CSG cell management unit (11) configured to manage one or a plurality of CSG cell IDs; and a control unit (14) configured to eliminate, during a predetermined period included in received broadcast information, a first CSG cell specified by a first CSG cell ID included in the received broadcast information, from target cells of a cell selection, a cell reselection, a PLMN selection or an automatic CSG cell search, when the first CSG cell ID is not managed by the CSG cell management unit.

2 Claims, 3 Drawing Sheets

OTHER PUBLICATIONS

3GPP TR 24.801 V8.0.1, Oct. 2008, "3rd Generation Partnership Project; Technical Specification Group Core Network and Terminals; 3GPP System Architecture Evolution; CT WG1 Aspects (Release 8)," 217 pages.

Office Action issued by Japanese PTO in JP2008-282569, mailed on Dec. 8, 2009, with translation, 4 pages.

International Search Report issued in PCT/JP2009/068598, mailed on Dec. 8, 2009, with translation, 4 pages.

Written Opinion issued in PCT/JP2009/068598, mailed on Dec. 8, 2009, with translation, 7 pages.

International Preliminary Report on Patentability issued in PCT/JP2009/068598, dated Jun. 7, 2011, with translation, 8 pages.

\* cited by examiner

MOBILE STATION, MOBILE COMMUNICATION METHOD AND NETWORK DEVICE

TECHNICAL FIELD

The present invention relates to a mobile station, a mobile communication method and a network device.

BACKGROUND ART

In mobile communication systems of the UMTS (Universal Mobile Telecommunication System) scheme and the LTE (Long Term Evolution) scheme, an introduction of "CSG (Closed Subscriber Group)" as a cell that is available only by a specific mobile station UE is currently considered.

In particular, installation of the CSG cell in, for example, indoor places which are out of reach of radio waves from existing radio base stations (macro cells) and providing specific service only to a specific mobile station UE are currently considered.

Location registration with respect to the CSG cell is required for the mobile station UE to use the CSG cell; and only the mobile station UE succeeded in the location registration can use the specific service in the CSG cell.

SUMMARY OF THE INVENTION

Problems to be Solved by the Invention

When the mobile station UE detects a CSG cell as a cell having the best radio state in a cell selection process, a cell reselection process, a PLMN selection process and an automatic CSG cell search process, the mobile station UE attempts to make a location registration with respect to the CSG cell; but the mobile station UE cannot use the CSG cell when the location registration is refused by the CSG cell.

When the mobile station UE continues detecting the CSG cell as a cell having the best radio state in the cell selection process, the cell reselection process, the PLMN selection process and the automatic CSG cell search process after the refusal, however, there is a problem that such a continued attempt to the location registration with respect to the CSG cell hinders location registration of the mobile station UE with respect to other cells.

Further, in this case, there is also a problem that since the mobile station UE repeatedly transmits location registration request signals to the CSG cell for which location registration has not been permitted, unnecessary traffic in the network increases and battery of the mobile station UE is wasted.

Further, in this case, there is a problem that since the mobile station UE continues to visit a CSG cell to which location registration is not completed, communication cannot be started.

Further, in this case, there is a problem that unnecessary processing time of the mobile station UE is required since the mobile station UE performs a cell selection, a cell reselection, a PLMN selection and an automatic CSG cell search with respect to a CSG cell to which location registration is not permitted.

The present invention has been made in view of the above-described problems and an object thereof is to provide a mobile station, a mobile communication method and a network device capable of avoiding performance of a useless location registration process, avoiding the above-described state in which communication cannot be started or shortening time required for the cell selection, the cell reselection, the PLMN selection or the automatic CSG cell search.

Means for Solving the Problem

A first aspect of the present invention is summarized as a mobile station including: a CSG cell management unit configured to manage one or a plurality of CSG cell IDs; and a control unit configured to eliminate a first CSG cell specified by a first CSG cell ID included in received broadcast information, from target cells of a cell selection, a cell reselection, a PLMN selection or an automatic CSG cell search, when the first CSG cell ID is not managed by the CSG cell management unit.

In the first aspect of the present invention, the control unit can be configured to set the first CSG cell to be the target cell of the cell selection, the cell reselection, the PLMN selection or the automatic CSG cell search, even if communication in the first CSG cell is restricted, when the first CSG cell ID is managed by the CSG cell management unit.

A second aspect of the present invention is summarized as a mobile communication method including the steps of: receiving, at a mobile station, broadcast information which includes a first CSG cell ID, in a first CSG cell; and eliminating, at the mobile station including a CSG cell management unit configured to manage one or a plurality of CSG cell IDs, the first CSG cell specified by the first CSG cell ID included in the received broadcast information, from target cells of a cell selection, a cell reselection, a PLMN selection or an automatic CSG cell search, when the first CSG cell ID is not managed by the CSG cell management unit.

A third aspect of the present invention is summarized as a network device, wherein: the network device is configured to transmit broadcast information which includes a first CSG cell ID and a predetermined period in a first CSG cell; and the predetermined period indicates a period during which a mobile station which includes a CSG cell management unit configured to manage one or a plurality of CSG cell IDs, eliminates a first CSG cell specified by the first CSG cell ID included in the received broadcast information, from target cells of a cell selection, a cell reselection, a PLMN selection or an automatic CSG cell search, when the first CSG cell ID is not managed by the CSG cell management unit.

Effect of the Invention

As described above, according to the present invention, a mobile station, a mobile communication method and a network device capable of avoiding performance of a useless location registration process, avoiding the above-described state in which communication cannot be started or shortening time required for the cell selection, the cell reselection, the PLMN selection or the automatic CSG cell search can be provided.

BEST MODES FOR CARRYING OUT THE INVENTION

Configuration of the Mobile Communication System According to the First Embodiment of the Present Invention With reference to FIGS. 1 and 2, a configuration of a mobile communication system according to a first embodiment of the present invention will be described.

Figure 1:
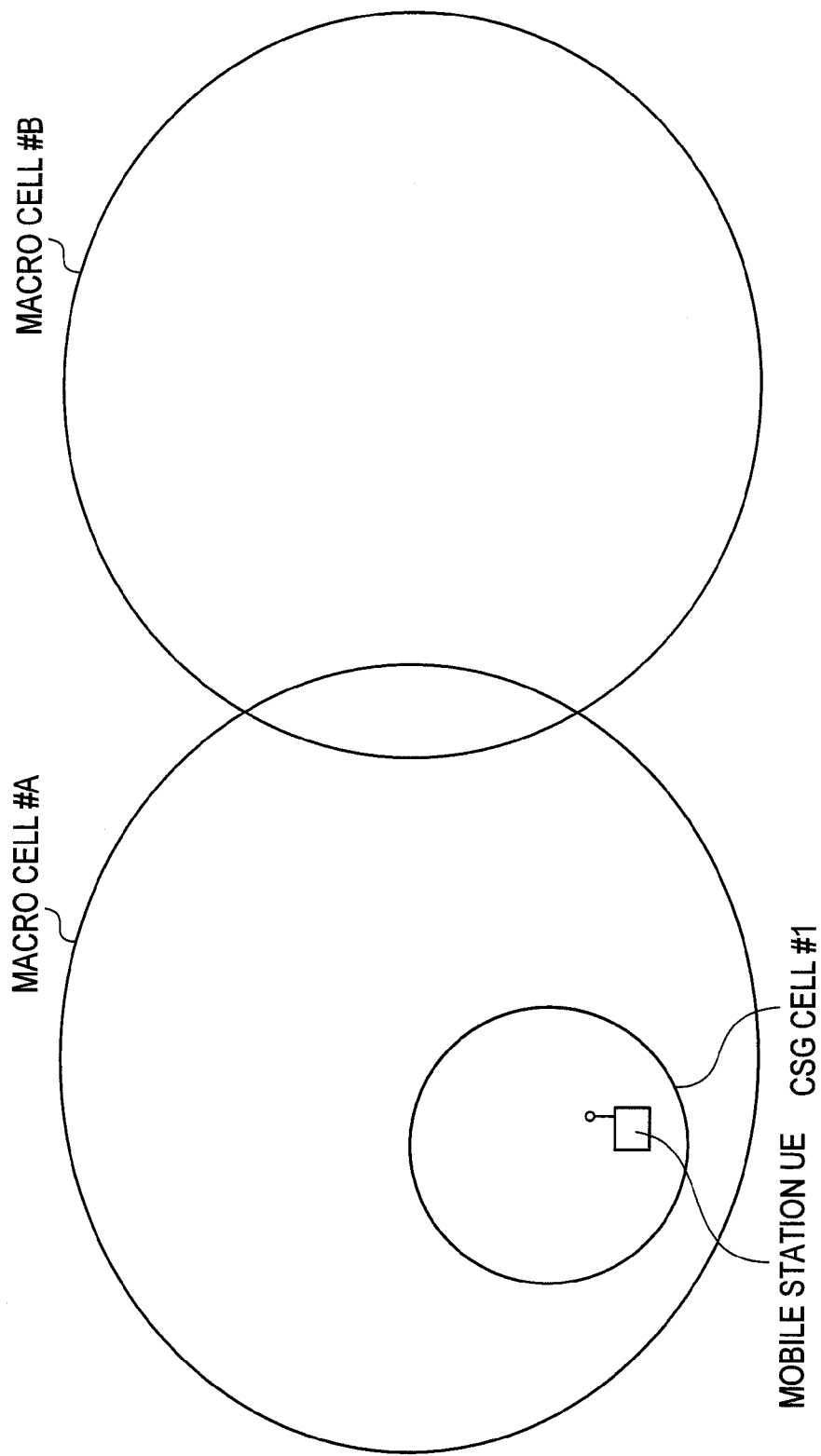
FIG. 1 is a diagram of an entire configuration of a mobile communication system according to a first embodiment of the present invention.

As illustrated in FIG. 1, the mobile communication system according to the present embodiment is configured to place a macro cell #A and a macro cell #B, and a CSG cell #1 is placed in the macro cell #A.

Here, in the mobile communication system according to the present embodiment, a network device, such as a radio base station eNB of the LTE scheme and a radio network controller RNC of the UMTS scheme, is configured to transmit broadcast information which includes a first CSG cell ID and a predetermined period in a first CSG cell.

Figure 2:
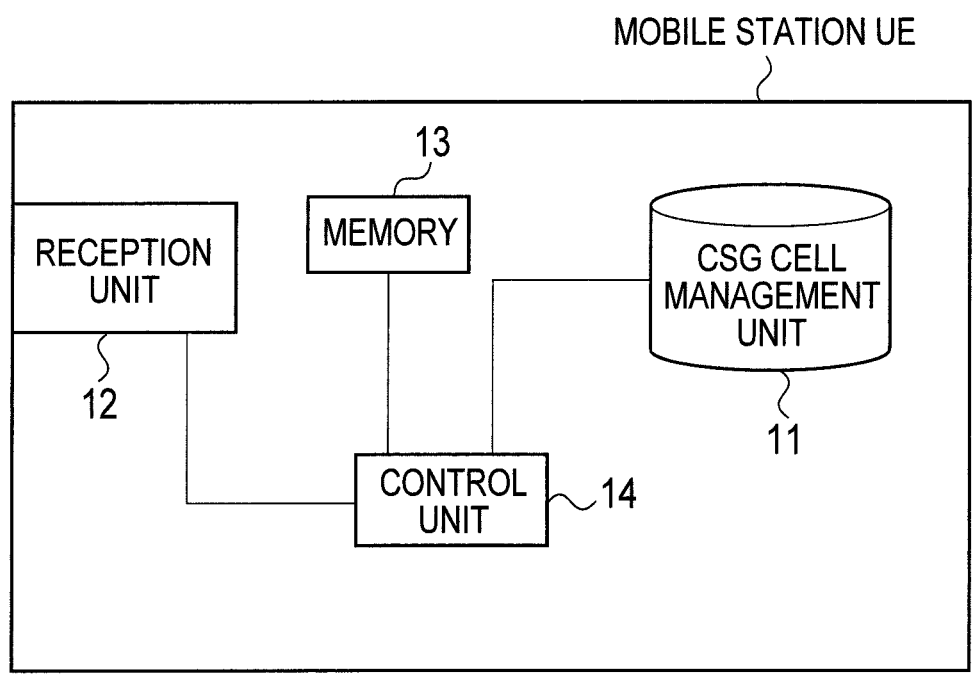
FIG. 2 is a functional block diagram of a mobile station according to the first embodiment of the present invention.

As illustrated in FIG. 2, the mobile station UE includes a CSG cell management unit 11, a reception unit 12, a memory 13 and a control unit 14.

The CSG cell management unit 11 is configured to manage one or a plurality of CSG cell IDs. Here, the CSG cell IDs managed by the CSG cell management unit 11 are cell IDs which specify CSG cells that can be used by the mobile station UE and are sometimes called a "White List".

For example, in the LTE scheme, the CSG cell ID is 29-bit information consisting of a "Cell Indicator (1 bit)" included in broadcast information SIB 1 and a "Cell ID (28 bits)" included in broadcast information SIB 2.

On the contrary, in the UMTS scheme, the CSG cell ID is 29-bit information consisting of a "Cell Indicator (1 bit)" included in broadcast information SIB 3 and a "Cell ID (28 bits)" included in broadcast information SIB 3.

The CSG cell ID may be configured to be stored in, for example, a shop of the mobile station UE or may be configured to be stored in response to a request by a user of the mobile station UE. Such a request may be made by a wired connection or a radio connection between a device for the registration and a terminal or may be made via a network.

The reception unit 12 is configured to receive broadcast information from neighbor cells, and to transmit the broadcast information to the control unit 14.

In particular, in the LTE scheme, the reception unit 12 is configured to transfer "$T_{barred}$", "Cell barred" and so on included in the received broadcast information SIB 1, to the control unit 14.

In the UMTS scheme, the reception unit 12 is configured to transfer "$T_{barred}$", "Cell barred" and so on included in the received broadcast information SIB 3, to the control unit 14.

For example, values which can be set in the "$T_{barred}$" are assumed to be 10 seconds, 20 seconds, 40 seconds, 80 seconds, 160 seconds, 320 seconds, 640 seconds, 1280 seconds and so on.

The reception unit 12 is configured to transfer a CSG cell ID consisting of "Cell Indicator" and "Cell ID" included in the received broadcast information, to the control unit 14.

The reception unit 12 is also configured to transfer "Primary Scrambling Code (a cell of UMTS scheme)" and "Physical Channel Identifier (a cell of LTE scheme)" of a detected cell, to the control unit 14.

The control unit 14 is configured to store the broadcast information transmitted from the reception unit 12 in the memory 13.

The control unit 14 is configured to perform a cell selection process, a cell reselection process, a PLMN selection process and an automatic CSG cell search. In particular, the control unit 14 is configured to perform the cell selection process and the PLMN selection process, when the mobile station UE enters an out-of-service range. The control unit 14 is also configured to perform the cell reselection process and the automatic CSG cell search process, when a predetermined condition is satisfied, and when the mobile station UE is in an idle state.

Usually, the control unit 14 is configured to set the cells stored in the memory 13 as the "Primary Scrambling Code (the cell of UMTS scheme)" or the "Physical Channel Identifier (the cell of LTE scheme)" to be target cells of the cell reselection or the automatic CSG cell search.

Further, the control unit 14 is configured to set all the cells in the mobile communication system according to the present embodiment (i.e., the cells specified by all the scramble codes in all the frequencies that can be used in the mobile communication system according to the present embodiment) to be target cells of the cell selection or the PLMN selection.

Here, the control unit 14 is configured to eliminate the CSG cell (a first CSG cell) specified by the CSG cell ID (a first CSG cell ID) which is included in the received broadcast information and is stored in the memory 13, from the target cells of the cell selection, the cell reselection, the PLMN selection or the automatic CSG cell search during a predetermined period specified by the "$T_{barred}$" included in the broadcast information, when the CSG cell ID (the first CSG cell ID) is not managed by the CSG cell management unit 11.

In particular, in this case, the control unit 14 may be configured to eliminate the first CSG cell from the target cells of the cell selection, the cell reselection, the PLMN selection or the automatic CSG cell search, by setting the "Cell barred" with respect to the first CSG cell, in the memory 13, by using the "Primary Scrambling Code (the cell of the UMTS scheme)" or the "Physical Channel Identifier (the cell of the LTE scheme)".

The control unit 14 may also be configured to perform the cell selection process targeting the CSG cell using the "Primary Scrambling Code (the cell of the UMTS scheme)" or the "Physical Channel Identifier (the cell of the LTE scheme)" which are managed at a constant cycle by the CSG cell management unit 11. Such a cell selection process is called an "automatic CSG selection process".

Here, the control unit 14 may be configured to set, when the above-described first CSG cell ID is managed by the CSG cell management unit 11, the first CSG cell to be the target cell of the cell selection, the cell reselection, the PLMN selection or the automatic CSG cell search, even if communication in the above-described first CSG cell is restricted (i.e., when the "Cell barred" is set in the broadcast information).

That is, the mobile station UE which is permitted to use the specific CSG cell is configured to be able to perform communication via a specific CSG cell, even if communication is restricted in that specific CSG cell.

In the CSG cell in the mobile communication system of the LTE scheme, the broadcast information to which the "Cell barred" is set may be transmitted all the time or the broadcast information to which no "Cell barred" is set may be transmitted all the time.

In the CSG cell in the mobile communication system of the UMTS scheme, the broadcast information to which the "Cell barred" is set may be transmitted all the time.

Operation of the Mobile Communication System According to the First Embodiment of the Present Invention With reference to FIGS. 3 and 4, an operation of the mobile communication system according to the first embodiment of the present invention, that is, in particular, an operation of the mobile station UE used in the mobile communication system according to the first embodiment of the present invention will be described.

First, with reference to FIG. 3, operations of the mobile station UE to perform the cell selection process, the cell reselection process, the PLMN selection process and the automatic CSG cell search process will be described.

Figure 3:
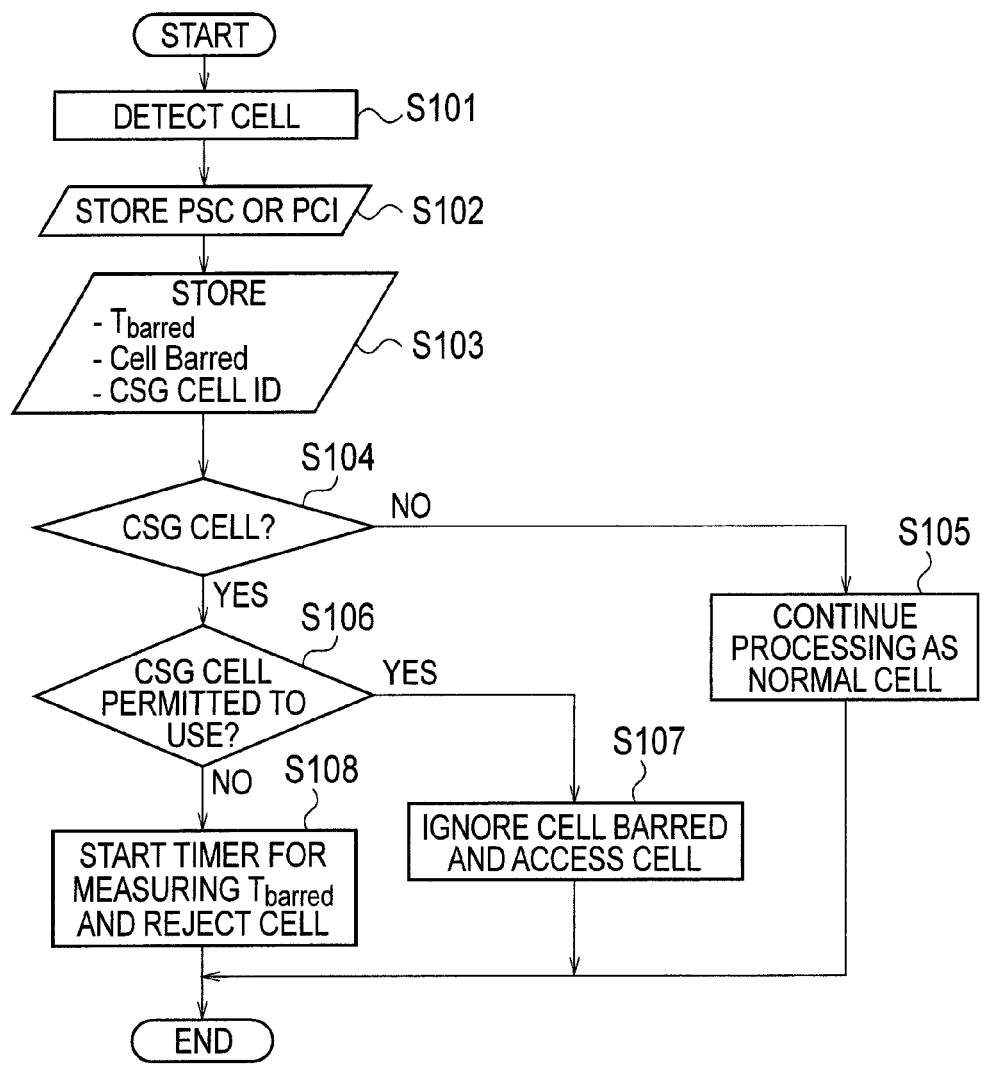
FIG. 3 is a flowchart illustrating an operation of the mobile station according to the first embodiment of the present invention.

As illustrated in FIG. 3, in step S101, the control unit 14 detects a cell as a trigger for the cell selection process, the cell reselection process, the PLMN selection process and the automatic CSG cell search process.

In step S102, the control unit 14 stores the "Primary Scrambling Code (the cell of the UMTS scheme)" or the "Physical Channel Identifier (the cell of the LTE scheme)" of the detected cell in the memory 13.

In step S103, the control unit 14 stores, in the memory 13, the "$T_{barred}$", the "Cell barred" and "CSG cell ID (or Cell ID)" included in the broadcast information from a cell selected as a cell having the best radio state.

In step S104, the control unit 14 determines whether or not the "CSG cell ID" is included in the broadcast information, that is, whether or not the cell selected as a cell having the best radio state is the CSG cell.

When it is determined that the "CSG cell ID" is included in the broadcast information, the operation proceeds to step S106, and otherwise, the operation proceeds to step S105.

In step S105, the control unit 14 continues the operation in accordance with a conventionally specified scheme in the cell selected as a cell having the best radio state.

In step S106, the control unit 14 determines whether or not the use of the CSG cell by the mobile station UE is permitted, that is, whether or not the CSG cell ID included in the broadcast information is managed by the CSG cell management unit 11.

When it is determined that the use is permitted, the operation proceeds to step S107, and otherwise, the operation proceeds to step S108.

The control unit 14 is configured to ignore the "Cell barred" set in the broadcast information, and to perform a location registration process with respect to the CSG cell in step S107.

In step S108, the control unit 14 starts a timer for measuring the "$T_{barred}$" and, until the "$T_{barred}$" elapses, eliminates the CSG cell from target cells of the cell selection, the cell reselection, the PLMN selection or the automatic CSG cell search (a cell rejection process).

Second, with reference to FIG. 4, an operation of the mobile station UE when the timer for measuring the "$T_{barred}$" expires will be described.

Figure 4:
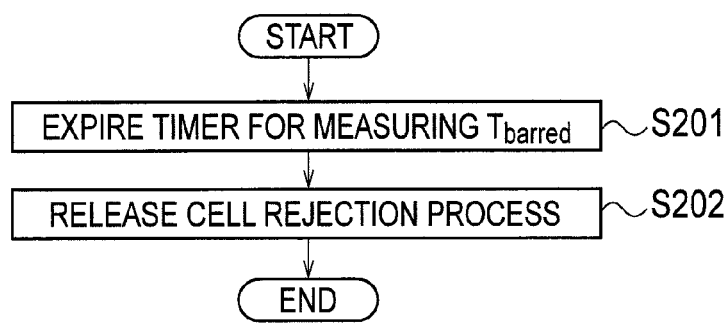
FIG. 4 is a flowchart illustrating an operation of the mobile station according to the first embodiment of the present invention.

As illustrated in FIG. 4, in step S201, the control unit 14 detects the expiration of the timer for measuring the "$T_{barred}$", that is, the elapse of the "$T_{barred}$" after the start of the cell rejection process.

In step S202, the control unit 14 releases the cell rejection process, that is, again sets the CSG cell to be the target cell of the cell selection, the cell reselection, the PLMN selection and the automatic CSG cell search.

Operation and Effect of the Mobile Communication System According to the First Embodiment of the Present Invention According to the mobile communication system according to the first embodiment of the present invention, an unnecessary location registration process can be avoided, an unnecessary effect on the network resource can be avoided and time required for the cell selection process, the cell reselection process, the PLMN selection process or the automatic CSG cell search process can be shortened, because the mobile station UE is configured to eliminate the CSG cell which is not permitted to use from the target cells of the cell selection, the cell reselection, the PLMN selection or the automatic CSG cell search in a predetermined period.

Similarly, according to the mobile communication system according to the first embodiment of the present invention, power consumption in the mobile station UE can be reduced, because the mobile station UE needs not to perform the cell selection process, the cell reselection process, the PLMN selection process or the automatic CSG cell search process with respect to the CSG cell which is not permitted to use.

Note that operation of the above described mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE. Also, the storage medium and the processor may be provided in the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile station comprising:
   a Closed Subscriber Group CSG cell management unit configured to manage one or a plurality of Closed Subscriber Group CSG cell IDs; and
   a control unit configured to eliminate a first Closed Subscriber Group CSG cell specified by a first Closed Subscriber Group CSG cell ID included in received broadcast information, from target cells of a cell selection, a cell reselection, a Public Land Mobile Network PLMN selection or an automatic Closed Subscriber Group CSG cell search, when the first Closed Subscriber Group CSG cell ID is not managed by the Closed Subscriber Group CSG cell management unit, wherein
   the control unit is configured to set the first Closed Subscriber Group CSG cell to be the target cell of the cell selection, the cell reselection, the Public Land Mobile Network PLMN selection or the automatic Closed Subscriber Group CSG cell search, even if communication in the first Closed Subscriber Group CSG cell is restricted, when the first Closed Subscriber Group CSG cell ID is managed by the Closed Subscriber Group CSG cell management unit.

2. A mobile communication method comprising the steps of:

receiving, at a mobile station, broadcast information which includes a first Closed Subscriber Group CSG cell ID, in a first Closed Subscriber Group CSG cell; and eliminating, at the mobile station including a Closed Subscriber Group CSG cell management unit configured to manage one or a plurality of Closed Subscriber Group CSG cell IDs, the first Closed Subscriber Group CSG cell specified by the first Closed Subscriber Group CSG cell ID included in the received broadcast information, from target cells of a cell selection, a cell reselection, a Public Land Mobile Network PLMN selection or an automatic Closed Subscriber Group CSG cell search, when the first Closed Subscriber Group CSG cell ID is not managed by the Closed Subscriber Group CSG cell management unit, wherein the mobile station is configured to set the first Closed Subscriber Group CSG cell to be the target cell of the cell selection, the cell reselection, the Public Land Mobile Network PLMN selection or the automatic Closed Subscriber Group CSG cell search, even if communication in the first Closed Subscriber Group CSG cell is restricted, when the first Closed Subscriber Group CSG cell ID is managed by the Closed Subscriber Group CSG cell management unit.

* * * * *